(12) United States Patent
Dragushan et al.

(10) Patent No.: US 11,195,165 B2
(45) Date of Patent: Dec. 7, 2021

(54) MODULATING MOBILE-DEVICE DISPLAYS BASED ON AMBIENT SIGNALS TO REDUCE THE LIKELIHOOD OF FRAUD

(71) Applicant: RetailMeNot, Inc., Austin, TX (US)

(72) Inventors: Aaron Dragushan, Austin, TX (US); Shaun F. Dubuque, Austin, TX (US)

(73) Assignee: RetailMeNot, Inc., Los Angeles, CA (US)

( * ) Notice: Subject to any disclaimer, the term of this patent is extended or adjusted under 35 U.S.C. 154(b) by 0 days.

(21) Appl. No.: 16/899,314

(22) Filed: Jun. 11, 2020

(65) Prior Publication Data

US 2021/0012317 A1 Jan. 14, 2021

Related U.S. Application Data

(63) Continuation of application No. 16/109,190, filed on Aug. 22, 2018, now Pat. No. 10,713,644, which is a
(Continued)

(51) Int. Cl.
| | |
|---|---|
| *G06K 9/62* | (2006.01) |
| *G06Q 20/32* | (2012.01) |
| *G06Q 20/20* | (2012.01) |
| *G06Q 20/38* | (2012.01) |
| *G06Q 20/34* | (2012.01) |

(Continued)

(52) U.S. Cl.
CPC ..... *G06Q 20/3226* (2013.01); *G06K 9/00536* (2013.01); *G06K 9/00624* (2013.01); *G06Q 20/202* (2013.01); *G06Q 20/3224* (2013.01); *G06Q 20/3433* (2013.01);
(Continued)

(58) Field of Classification Search
CPC ........... G06Q 20/3224; G06Q 20/4016; G06Q 20/204; G06Q 20/206; G06Q 30/0238; H04W 4/021; G06K 9/0063; G06K 9/00637
See application file for complete search history.

(56) References Cited

U.S. PATENT DOCUMENTS

| | | | |
|---|---|---|---|
| 8,662,387 B1 | 3/2014 | Geller et al. | |
| 9,147,122 B2 * | 9/2015 | Chao | G06T 7/73 |

(Continued)

OTHER PUBLICATIONS

Article 94(3) EPC for European Application No. 16793626.9 mailed Sep. 28, 2020, 10 pages.

*Primary Examiner* — Brian Werner
(74) *Attorney, Agent, or Firm* — Womble Bond Dickinson (US) LLP

(57) ABSTRACT

Provided is a process of classifying ambient signals to reduce fraudulent use of information, the process including: receiving, with the mobile computing device, from a remote server, balance-access information by which a stored value card balance can be spent at a point of sale terminal; storing, with the mobile computing device, the balance-access information; sensing, with one or more sensors of a mobile computing device, ambient signals; classifying the ambient signals as indicating the user is in a retail establishment; and in response to the classification, displaying, on a display screen of the mobile computing device, the balance-access information, such that the balance-access information can be input to a point-of-sale terminal.

19 Claims, 4 Drawing Sheets

Related U.S. Application Data continuation of application No. 15/154,482, filed on May 13, 2016, now Pat. No. 10,078,830, which is a continuation-in-part of application No. 14/839,058, filed on Aug. 28, 2015, now Pat. No. 9,684,826.

(60) Provisional application No. 62/160,811, filed on May 13, 2015, provisional application No. 62/072,044, filed on Oct. 29, 2014, provisional application No. 62/043,069, filed on Aug. 28, 2014.

(51) Int. Cl.
  *G06K 9/00* (2006.01)
  *G06Q 30/02* (2012.01)
  *G06Q 30/06* (2012.01)

(52) U.S. Cl.
  CPC ..... *G06Q 20/3829* (2013.01); *G06Q 30/0207* (2013.01); *G06Q 30/06* (2013.01); *G06Q 2220/00* (2013.01)

(56) References Cited

U.S. PATENT DOCUMENTS

| | | |
|---|---|---|
| 2004/0243519 A1 | 12/2004 | Perttila et al. |
| 2005/0080728 A1 | 4/2005 | Sobek |
| 2009/0307028 A1 | 12/2009 | Eldon et al. |
| 2010/0106662 A1 | 4/2010 | Ramaswamy |
| 2013/0132277 A1 | 5/2013 | Naqvi |
| 2014/0006190 A1 | 1/2014 | Loomis, III et al. |
| 2014/0181908 A1 | 6/2014 | Doris-Down et al. |
| 2014/0249904 A1* | 9/2014 | Nelsen ............... G06Q 20/10 705/14.23 |
| 2015/0019432 A1 | 1/2015 | Burns |
| 2015/0326716 A1* | 11/2015 | Figa ................... H04W 4/12 379/215.01 |
| 2016/0307556 A1* | 10/2016 | Chan ............... G10K 11/17873 |

\* cited by examiner

MODULATING MOBILE-DEVICE DISPLAYS BASED ON AMBIENT SIGNALS TO REDUCE THE LIKELIHOOD OF FRAUD

CROSS-REFERENCE TO RELATED APPLICATIONS

The present application is continuation of U.S. patent application Ser. No. 16/109,190, titled "MODULATING MOBILE-DEVICE DISPLAYS BASED ON AMBIENT SIGNALS TO REDUCE THE LIKELIHOOD OF FRAUD," filed on 22 Aug. 2018, which is a continuation of U.S. patent application Ser. No. 15/154,482, titled "MODULATING MOBILE-DEVICE DISPLAYS BASED ON AMBIENT SIGNALS TO REDUCE THE LIKELIHOOD OF FRAUD," filed on 13 May 2016, which claims the benefit of U.S. Provisional Patent Application 62/160,811, titled "Dynamic Gift Card Allocation," filed 13 May 2015, and is a continuation-in-part of U.S. patent application Ser. No. 14/839,058, titled "REDUCING THE SEARCH SPACE FOR RECOGNITION OF OBJECTS IN AN IMAGE BASED ON WIRELESS SIGNALS," filed 28 Aug. 2015, which claims the benefit of U.S. Provisional Patent Applications 62/072,044, filed 29 Oct. 2014, and U.S. Provisional Patent Applications 62/043,069, filed 28 Aug. 2014. The entire content of each of these earlier-filed applications is hereby incorporated by reference for all purposes.

BACKGROUND

1. Field

The present invention relates generally to limiting access to information on mobile computing devices and, more specifically, to modulating mobile-device displays based on ambient signals to reduce the likelihood of fraud.

2. Description of the Related Art

In some cases, people obtain valuable goods and services from others in exchange for drawing upon a balance in a stored value card, which includes the digital equivalent. Examples include open-loop stored value cards and closed-loop stored value cards, each of which may take various forms, such as gift cards, rebate cards, payroll cards, and the like. In many cases, the value stored on the card is spent by presenting to a retailer certain information, such as a card number and a pin number.

Recently, online exchanges have arisen where those in possession of such cards sell the cards, often at a discount relative to the card balance. For example, a user may receive a gift card, as a birthday present, to a store that the user no longer favors, and the user may sell the card, in exchange for cash or another type of card, to the exchange or a different user on such an exchange. In some cases, access to the value of the card is conveyed by sending the card and pin numbers, without transferring possession of any physical token, like the card itself. Thus, a buyer of a card may receive information, for example, an email, text, or in-app data, that they can present on their mobile device to a retailer to buy goods or services with the value remaining on the card. In some cases, the user may then re-sell or leave a remaining balance on the card back to an exchange, or the exchange may authorize the user to only use a portion of the value stored on the card.

This approach, while relatively convenient for users, can give rise to certain types of fraud. One consequence of granting access to cards via networks, e.g., with mobile computing devices, without transferring a physical token, is that each party having access to the card (e.g., the seller, the first buyer who spends part of the balance, the second buyer who spends another part, and so on) could potentially retain the information needed to spend the remaining balance on the card, even after the card has been sold on the exchange or returned to the exchange. For instance, there is a risk the first buyer could use part of the card's balance, return the card to the exchange, and then spend the remaining balance on the card before the card is sold again on the exchange (or after the card is sold but before it is used by the second buyer).

SUMMARY

The following is a non-exhaustive listing of some aspects of the present techniques. These and other aspects are described in the following disclosure.

Some aspects include a process of classifying ambient signals to reduce fraudulent use of information, the process including: receiving, with the mobile computing device, from a remote server, balance-access information by which a stored value card balance can be spent at a point of sale terminal; storing, with the mobile computing device, the balance-access information; sensing, with one or more sensors of a mobile computing device, ambient signals; classifying the ambient signals as indicating the user is in a retail establishment; and in response to the classification, displaying, on a display screen of the mobile computing device, the balance-access information, such that the balance-access information can be input to a point-of-sale terminal.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
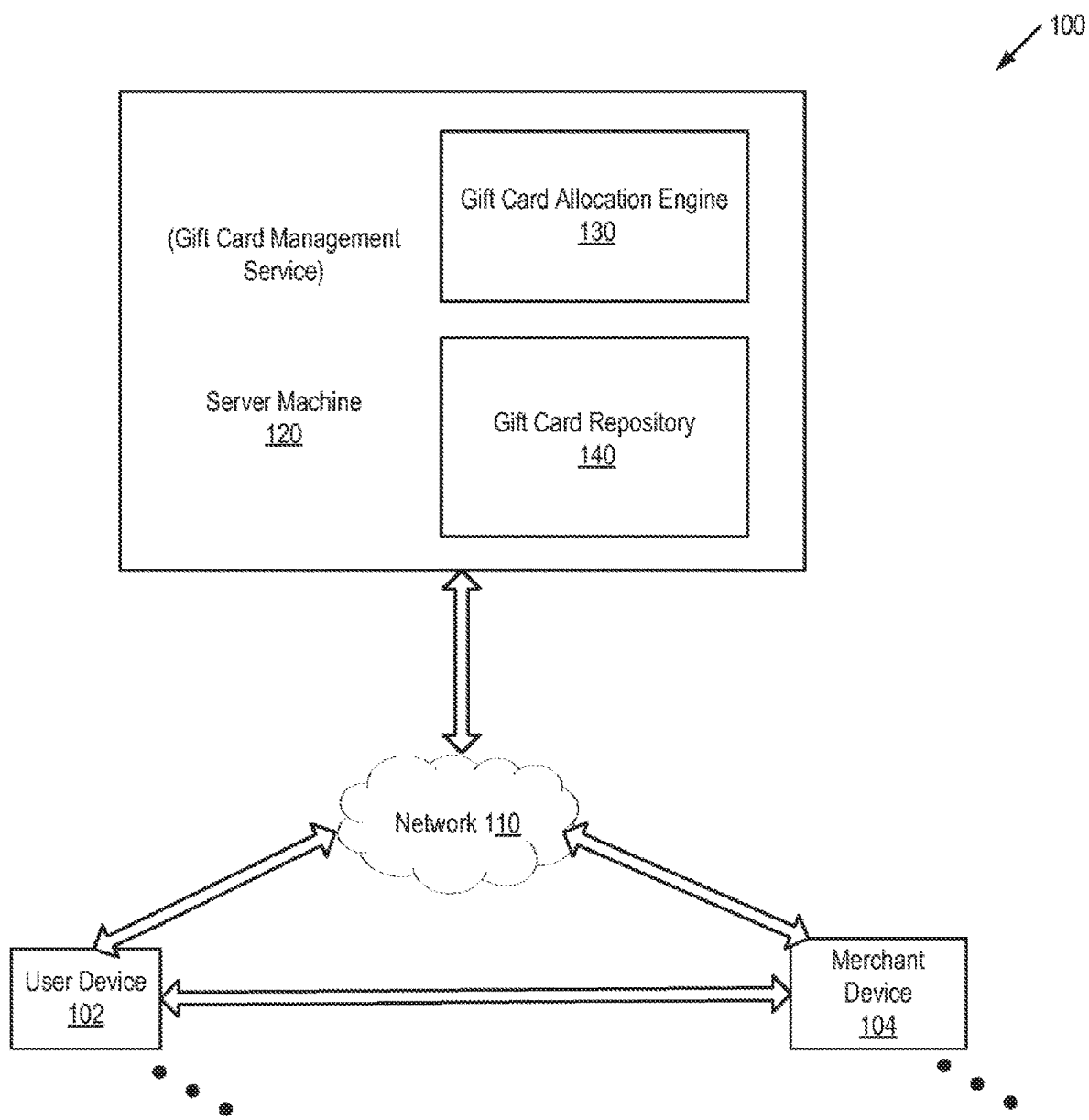
FIG. 1 illustrates the logical architecture of an example of a gift card management system in accordance with some of the present techniques.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer security and payment processing systems. Indeed, the inventors wish to emphasize the difficulty of recognizing those problems that are nascent and will become much more apparent in the future should trends in industry continue as the inventors expect and particularly those problems that cross the boundaries of distinct fields, as is the case here. Further, because multiple problems are addressed, it should be understood that some embodiments are problem-specific, and not all embodiments address every problem with traditional systems described herein or provide every benefit described herein. That said, improvements that solve various permutations of these problems are described below.

It can be appreciated that while many retail establishments use gift cards (e.g., prepaid cards or vouchers that can be used for purchases at the establishment, also referred to as stored value cards), numerous inefficiencies exist. For example, individuals may own gift cards from a retailer from which they are not interested in purchasing anything.

Accordingly, described herein in various implementations are technologies that enable the centralized exchange of such gift cards. Such cards can be bought and sold at a discount, thereby providing liquidity to the original card owner as well as a discounted purchase price (as compared to the original retail price of an item being purchased) to the buyer. Additionally, as described herein, the referenced technologies can provide/maintain a gift card repository and can enable the efficient utilization of such cards in retail settings (both 'brick and mortar' and ecommerce). For example, using a mobile application executing on a mobile device (in conjunction with a central gift card repository/server), a user can utilize gift cards to make retail purchases (thereby benefitting from the discount associated with the utilization of otherwise unused gift cards) in substantially the same amount of time as a conventional retail checkout process would take. In doing so, the user can benefit from the discount associated with gift card utilization while maintaining an efficient/seamless checkout process/experience.

However, as noted, in many Internet-based use cases, everyone who is given access to a gift card (e.g., the information needed to spend), or some other type of stored-value card, and then returns the card, is in position to double spend the balance. In many cases, to use the gift card, the mobile device displays the information used to authorize a transaction on the gift card. As a result, a nefarious user could write down that information, return the card on an exchange, and then use their own record of the information to draw down the card's balance before another authorized use by another person.

This problem is unique to the Internet age because copies of the information are shared, potentially anonymously, over networks, and the ease of transacting results in balances being sliced more finely, putting the card information potentially in the possession of several untrusted parties. Further, users of these systems often expect a seamless experience, and slow, cumbersome authentication schemes are often not commercially feasible. Compounding these challenges, operators of gift card exchanges are often not in a position to dictate technical specifications of the point-of-sale terminals or transaction processing systems by which the cards are spent. As a result, efforts to mitigate fraud often need to accommodate legacy point-of-sale and transaction processing systems.

Some embodiments described below may limit the user's ability to obtain the sensitive card information, e.g., the card number or pin number. Some embodiments may probabilistically classify ambient signals as indicating whether the user is likely at a place where there is a legitimate use of the card, e.g., at a retail store that accepts the card, and in some cases, at certain types of retail stores. The result of the classification may be used to determine whether to display the card information on a display screen of a mobile computing device. For instance, the card information may remain un-displayed and encrypted on the user's mobile computing device until the user 1) requests to use the card; and 2) ambient signals are classified as indicative of legitimate use. In contrast, users who attempt to view the card information when there is no legitimate use likely, like viewing card numbers or pin numbers while at home with a card only usable for in-store transactions, may be prevented from viewing the card's information.

FIG. 1 depicts an illustrative system architecture 100, in accordance with one implementation of the present disclosure. The system architecture 100 includes one or more user devices 102, merchant devices 104, and server machine 120. These various elements or components can be connected to one another via network 110, which can be a public network (e.g., the Internet), a private network (e.g., a local area network (LAN) or wide area network (WAN)), or a combination thereof. Additionally, in certain implementations various elements may communicate and/or otherwise interface with one another (e.g., user device 102 with merchant device 104). The various illustrated computing devices may be formed with one or more of the types of computer systems described below with reference to FIG. 4.

User device 102 can be a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, an in-vehicle computer/system, any combination of the above, or any other such computing device capable of implementing the various features described herein. Various applications, such as mobile applications ('apps'), web browsers, etc. (not shown) may run on the user device (e.g., on the operating system of the user device). It should be understood that, in certain implementations, user device 102 can also include and/or incorporate various sensors and/or communications interfaces (not shown). Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface, NFC interface, etc.

Merchant device 104 can be a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, an in-vehicle computer/system, a point of sale (POS) system, device, and/or terminal, any combination of the above, or any other such computing device capable of implementing the various features described herein. Various applications, such as mobile applications ('apps'), web browsers, etc. (not shown) may run on the merchant device (e.g., on the operating system of the merchant device). It should be understood that, in certain implementations, merchant device 104 can also include and/or incorporate various sensors and/or communications interfaces (not shown). Examples of such sensors include but are not limited to: accelerometer, gyroscope, compass, GPS, haptic sensors (e.g., touchscreen, buttons, etc.), microphone, camera, barcode scanner, etc. Examples of such communication interfaces include but are not limited to cellular (e.g., 3G, 4G, etc.) interface(s), Bluetooth interface, WiFi interface, USB interface, NFC interface, etc. It should be understood that in certain implementations merchant device 104 may be a dedicated POS terminal (e.g., including an integrated barcode scanner) while in other implementations merchant device 104 may be a handheld or personal computing device (e.g., smartphone, tablet device, personal computer, etc.) configured to provide POS functionality (whether utilizing the functionality provided by the various components/sensors of the device or via one or more connected peripherals). It should also be understood that, in certain implementations, merchant device 104 can be a server, such as a webserver that provides an ecommerce site/service, such as may be accessed by user device 102 via a website and/or dedicated application.

Server machine 120 can be a rackmount server, a router computer, a personal computer, a portable digital assistant, a mobile phone, a laptop computer, a tablet computer, a camera, a video camera, a netbook, a desktop computer, a smartphone, any combination of the above, or any other such computing device capable of implementing the various features described herein. Server machine 120 can include components such as gift card allocation engine 130, and gift card repository 140. The components can be combined together or separated in further components, according to a particular implementation. It should be noted that in some implementations, various components of server machine 120 may run on separate machines (for example, gift card repository 140 can be a separate device). Moreover, some operations of certain of the components are described in more detail below.

Gift card repository 140 can be hosted by one or more storage devices, such as main memory, magnetic or optical storage based disks, tapes or hard drives, NAS, SAN, and so forth. In some implementations, gift card repository 140 can be a network-attached file server, while in other implementations gift card repository 140 can be some other type of persistent storage such as an object-oriented database, a relational database, and so forth, that may be hosted by the server machine 120 or one or more different machines coupled to the server machine 120 via the network 110, while in yet other implementations gift card repository 140 may be a database that is hosted by another entity and made accessible to server machine 120. Gift card repository 140 can store information relating to various gift cards, such as codes, bar codes, and/or any other such identifiers, as well as information relating to such cards (e.g., monetary value, expiration date, usage restrictions, etc.).

It should be understood that though FIG. 1 depicts server machine 120 and devices 102 and 104 as being discrete components, in various implementations any number of such components (and/or elements/functions thereof) can be combined, such as within a single component/system. For example, in certain implementations devices 102 and/or 104 can incorporate features of server machine 120.

As described in detail herein, various technologies are disclosed that enable dynamic gift card allocation. In certain implementations, such technologies can encompass operations performed by and/or in conjunction with gift card allocation engine 130.

Figure 2:
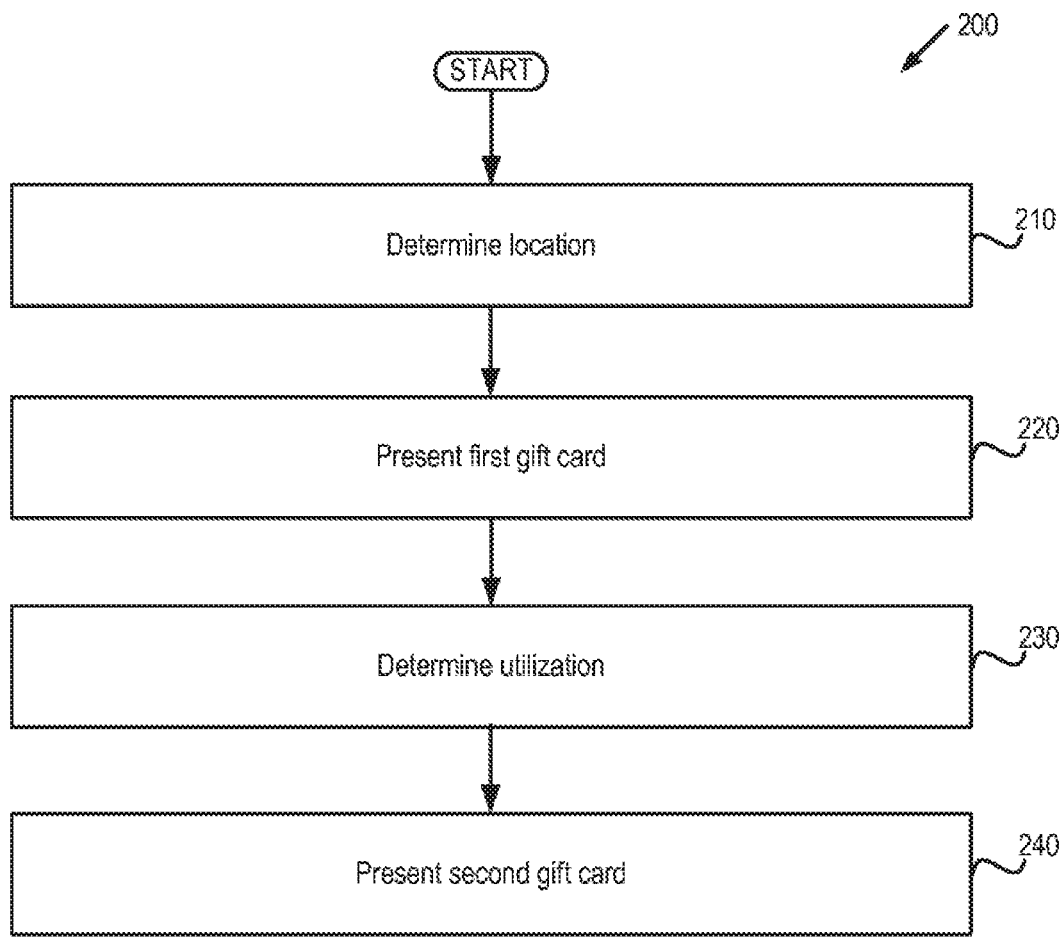
FIG. 2 illustrates an example of a gift card distribution process that may be executed by some embodiments of the system of FIG. 1.

FIG. 2 depicts a flow diagram of aspects of a method 200 for dynamic gift card allocation. The method is performed by processing logic that may comprise hardware (circuitry, dedicated logic, etc.), software (such as is run on a general purpose computer system or a dedicated machine), or a combination of both. In one implementation, the method is performed by one or more elements depicted and/or described in relation to FIG. 1, while in some other implementations, one or more blocks of FIG. 2 may be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 210, a location of a device (e.g., user device 102) can be determined. At block 220, a first gift card can be presented at the device, such as in a manner described herein. In certain implementations, such a gift card can be presented based on the location (e.g., the location of the device determined at block 210). At block 230, it can be determined that the first gift card has been utilized in a transaction. At block 240, a second gift card can be provided at the device. In certain implementations, such a gift card can be provided based on a determination that the first gift card (e.g., the gift card presented at block 220) has been utilized in the transaction. Various aspects of the referenced operations are described and illustrated in greater detail herein.

By way of further illustration, an application ('app') executing on user device 102 can request or otherwise determine a current location of the device (e.g., based on GPS coordinates, etc.). Based on the determined location, information regarding one or more retail establishments (e.g., those within a defined proximity to the current location) can be requested/retrieved and presented at the device. In certain implementations, such information can reflect those proximate retail establishments with respect to which gift cards are available (e.g., at gift card repository 140 of server machine 120).

Upon receiving a selection (e.g., by the user) of a particular retail establishment, one or more gift cards (e.g., barcodes, etc., stored in gift card repository 140) can be requested/received by the user device. It should be noted, however, that in certain implementations such gift card information may be requested/received upon determining the location of the device (e.g., by requesting gift cards for those retail establishments that are proximate to the device, maintaining such cards in memory, and presenting them upon receiving a selection by the user of a particular establishment).

In certain implementations, an input can be received (e.g., as provided by the user via the device) that reflects a sale/purchase amount (e.g., the total amount charged by the retailer for a particular purchase, e.g., '$54.63'). Upon receiving such a selection, one or more gift cards can be received, requested, and/or selected (e.g., from those gift cards previously received and stored in the memory of the user device). In certain implementations, such gift cards can be selected/requested (e.g., from gift card repository 140) based on any number of factors, such as the degree to which the credit amount of the gift card approximates/corresponds to the sale/purchase amount. Moreover, in certain implementations the user may be provided with the option to select whether to utilize relatively more gift cards (e.g., of smaller increments, together which add up to the total purchase price, thereby receiving a larger discount), or relatively fewer gift cards (some of which may be of larger increments, thereby necessitating the use of a smaller number of gift cards and providing a more expedient check out process). Additionally, in certain implementations various predictions/projections can be computed with respect to the sale/purchase amount (e.g., based on the retail establishment, the user's purchase history, the amount of time the user has spent in the store, the distance the user has traveled in the store, the areas/departments of the store that the user has visited, etc.), and one or more gift cards can be selected/provided based on such predictions/projections.

Moreover, in certain implementations a gift card having a value that exceeds the total sale/purchase amount may be selected/provided. Upon completion of the transaction, the remaining balance on the gift card can subsequently be provided (e.g., to another user) with respect to another transaction. By way of illustration, a first user may initiate a transaction totaling $60 and a gift card having $100 worth of credit may be selected/provided (e.g., in a manner described herein) in order to complete the transaction (leaving the gift card with $40 worth of credit). Subsequently, a second user may, for example, initiate a transaction totaling $40 and the same gift card (now having $40 worth of credit) may be selected/provided (e.g., in a manner described herein) in order to complete the transaction (thereby utilizing the entire remaining value on the gift card). In doing so, a single gift card can be utilized by different users at different times for different transactions. Moreover, in certain implementations each user will only be required to pay or otherwise account for the portion/increment of the gift card utilized for his/her purchase. Additionally, in certain implementations, once a particular gift card is utilized in a first transaction, such a gift card may be temporarily held (e.g., for a defined period of time and/or until a confirmation of the original transaction and/or the current balance of the card is received/determined) prior to providing the card again for a subsequent transaction. In doing so, the remaining balance on the card can, for example, be confirmed prior to providing it in another transaction.

Additionally, in certain implementations the referenced gift card(s) can be provided to the user device in advance of charging, debiting, etc., the requesting user for the value of the card. That is, as noted above, it can be appreciated that while a gift card of a particular total value (e.g., $100) may be selected/provided in order to complete the transaction, in many scenarios the user may only use a portion of the total value of the card (e.g., $60). As such, in lieu of charging the user the full value of the card (e.g., $100), the gift card can instead be selected/provided (e.g., before the transaction has been completed and without initially charging/debiting the requesting user for the full value of the card), and once the transaction is complete the user can be charged/debited for the increment used during the transaction (e.g., based on the total purchase price as provided by the user, an independent verification of the gift card balance, etc.) while the remaining value on the gift card can be utilized in subsequent transaction(s) (e.g., by other users), such as in a manner described herein.

The various selected/received gift cards can then be sequentially presented/provided, e.g., on the screen of the user device. The user device (e.g., a smartphone) can be placed or otherwise oriented in relation to the merchant device (e.g., in relation to the barcode scanner of a POS terminal) such that the merchant device can scan, read, or otherwise perceive or capture the code/barcode of the gift card being presented. In doing so, the user can complete the retail transaction using gift cards originating at server machine 120. Moreover, in certain implementations a comparable/related technique can be employed with respect to coupons. For example, in certain implementations various coupons can be presented on the screen of the device in a sequence such that they can be received/processed by the merchant device in succession.

It should be understood that in scenarios in which multiple gift cards are to be utilized, such gift cards can be provided sequentially in any number of ways. For example, in certain implementations feedback can be provided/received (e.g., provided by the user to the device, such as by swiping a touch screen or pressing a button) which indicates that another gift card is to be presented. It should also be noted that, in certain implementations, feedback may be provided/received, indicating that a particular gift card did not work (in which case a replacement card can be retrieved/provided).

By way of further example, in certain implementations various sensory inputs can be received and processed by the user device which can be determined to indicate that a presented gift card has been processed and that a subsequent gift card is to be presented (if relevant/necessary). By way of illustration, in certain implementations various audio inputs (e.g., a 'beep' or tone emitted by the merchant device, indicating that a barcode has been scanned) can be received by the user device (e.g., by an integrated or external microphone), and such inputs can be processed to determine that the presented gift card has been processed (and that another gift card, if necessary, is to be presented). By way of further illustration, in certain implementations various visual/optical inputs (e.g., a flash or pulse of the barcode scanner of the merchant device, indicating that a barcode has been scanned) can be received/perceived by the user device (e.g., by an integrated 'front facing' camera), and such inputs can be processed to determine that the presented gift card has been processed (and that another gift card, if necessary, is to be presented). By way of yet further illustration, in certain implementations various motion inputs (e.g., a rotation/orientation of the user device, indicating that a barcode has likely been scanned) can be identified by the user device (e.g., via an integrated accelerometer, gyroscope, etc.), and such inputs can be processed to determine that the presented gift card has likely been processed (and that another gift card, if necessary, is to be presented). It should also be noted that, in certain implementations, various aspects of the timing of the presentation of the referenced gift cards can also be accounted for, such that, for example, upon presenting a particular gift card for a defined time interval (e.g., 10 seconds), another gift card can be selected/requested and displayed.

As noted, certain users may attempt to fraudulently/ improperly use the described technologies, such as by capturing/recording gift cards that are presented in order to utilize them at a later time. Accordingly, in order to ensure that presented gift cards are likely to be utilized in legitimate retail scenarios, various determinations can be made, based on which a score can be computed, reflecting the likelihood that the card is (or is not) being used fraudulently. For example, one or more inputs from various motion sensors (e.g., accelerometer, gyroscope, etc.) can be received and processed in order to determine the manner/pattern in which the user device is being maneuvered. A user device that is presenting the gift cards legitimately (e.g., in a retail setting) is likely to exhibit a consecutive series of movements/ rotations (e.g., placing the device face down, followed by a rotation of the device such that it is face up, followed by another rotation to face down, etc.), while a device that is being used inappropriately (such that, for example, card numbers/codes are being recorded by the user) is less likely to exhibit such motion (as the user is likely to simply hold the device in place and cycling through multiple cards). Accordingly, in certain implementations the user device and/or the referenced app executing thereon can be configured to present/display the referenced gift cards/barcodes while the device is determined to be positioned in a particular orientation (e.g., face down, as the device is likely to be oriented when the barcode is being scanned), while not presenting (or obscuring) such cards/codes when the device is not so oriented. In doing so, the card/code can be presented when being legitimately used/scanned while not being presented in other orientations which may otherwise enable improper usage. By way of further example, one or more audio inputs can be received (e.g., by an integrated or external microphone) and processed in order to determine an amount/level of sound/noise (e.g., ambient noise) perceptible to the device. In scenarios in which the user device is presenting the gift cards legitimately (e.g., in a retail setting), a certain degree of ambient noise (and/or various sounds, talking, beeps, etc.) is likely to be perceptible, while with respect to a device that is being used inappropriately (such that, for example, card numbers/codes are being recorded by the user), such audio inputs/noise are less likely to be perceived. By way of yet further example, one or more visual inputs can be received (e.g., as captured by one or more integrated cameras) and processed in order to identify/ determine various aspects of the surroundings of the device. In scenarios in which the user device is presenting the gift cards legitimately (e.g., in a retail setting), various elements, characteristics, etc. (and changes thereto), are likely to be perceptible, while with respect to a device that is being used inappropriately (such that, for example, card numbers/codes are being recorded by the user), such visual elements, characteristics, etc. are relatively less likely to be perceived/ identified. In yet other examples, various aspects of the location of the user device can be accounted for in determining the likelihood that the presented gift cards are (or are not) being used legitimately. For example, utilization of the referenced application in an area that is determined to be residential (and/or is not determined to be a retail location) can indicate that the usage is more likely to be improper.

Some embodiments may automatically check balances for sold and surrendered cards to ascertain whether a card that has been surrendered has had the card balance change, possibly indicating fraud by a user who copied the information on the card. In some cases, the balance checks may be performed through automated interaction with a telephone menu (e.g., by synthesizing appropriate key presses or voice responses and emitting corresponding audio). In some cases, the rate of such checks may be modulated responsive to use of a card, e.g., the rate of checks may be elevated for a threshold amount of time after a card is returned. Some embodiments may perform such checks while a user purports to be in a store, e.g., in response to the user requesting a card or crossing a geofence, to ascertain whether the card was in fact used for a purchase. In some cases, some embodiments may flag a transaction as potentially indicative of fraud in response to a user requesting a card and the balance not changing within a threshold duration of time.

Upon completion of the transaction (e.g., when enough gift cards have been presented by the user device to cover the cost of the purchase), feedback/input can be received by the user device (as provided, for example, by the user) indicating that the transaction is complete (at which point additional gift cards will not be displayed). Moreover, in certain implementations, various aspects of the location of the device can be used in determining that the transaction is complete (and that additional gift cards are not to be displayed). For example, upon determining that the device has traveled beyond a certain distance (e.g., 50 feet) from the area in which the transaction was initiated (and/or from the location of the retail establishment), it can be further determined that the transaction is likely to be complete and additional gift cards will not be presented.

Some embodiments may limit access to a threshold amount of cards, or cards having an aggregate balance, based on statistical distribution of cart values for a particular retail store. For instance, some embodiments may obtain transaction records for each of a set of stores, and for each store, some embodiments may calculate population or sample statistics indicative of a measure of central tendency (e.g., mean, mode, or median) and a measure of variability (e.g., a variance, standard deviation, etc.). Some embodiments may infer a threshold amount above which cart values for a particular store are expected to be very unlikely, e.g., accounting for less than $1/100$, less than $1/1,000$, or less than $1/10,000$ of the transactions at a retail store. Some embodiments may select cards to be sent to a user based on whether those cards, either individually or in the aggregate, contain a balance exceeding this threshold, rejecting cards that would cause the threshold to be exceeded.

As noted above, in order to prevent fraudulent/improper use of the described technologies, various forms of verification/authentication can be incorporated. For example, in certain implementations, in order to utilize the described technologies, the user may be prompted to log in or otherwise associate their gift card usage with a third party login, service, account, etc.

In certain implementations, server machine 120 and/or gift card allocation engine 130 can be configured to select/ provide various gift cards based on any number of factors. For example, with respect to gift card sellers that have been determined to be relatively more likely to sell/provide gift cards that may not work, gift cards that are provided by such sellers can be prioritized (e.g., provided to a requesting user as soon as possible), as the more time elapses from the time of sale of the card, the greater the likelihood that the card may not work. By way of further example, with respect to new gift card sellers, gift cards that are provided by such sellers can be prioritized (e.g., provided to a requesting user as soon as possible), in order to provide such sellers with quicker payment for the cards they provide.

It should also be noted that while the much of the foregoing description has illustrated various aspects of the described technologies in relation to utilizing mobile devices in retail transactions (e.g., in conjunction with a POS terminal), in certain implementations the referenced technologies can also be implemented in ecommerce settings (e.g., in conjunction with a web browser). For example, via a browser plugin (and/or any other such application, module, etc.), upon determining that a user is checking out of an ecommerce site (e.g., finalizing/executing an ecommerce transaction), various aspects of the webpage/'shopping cart' can be processed/analyzed. In doing so, the final purchase price can be determined and one or more gift cards can be provided/presented within the checkout interface. In doing so, the user can complete the ecommerce transaction while availing themselves of savings attendant with paying via gift cards.

It should also be noted that while the technologies described herein are illustrated primarily with respect to dynamic gift card allocation, the described technologies can also be implemented in any number of additional or alternative settings or contexts and towards any number of additional objectives.

Figure 3:
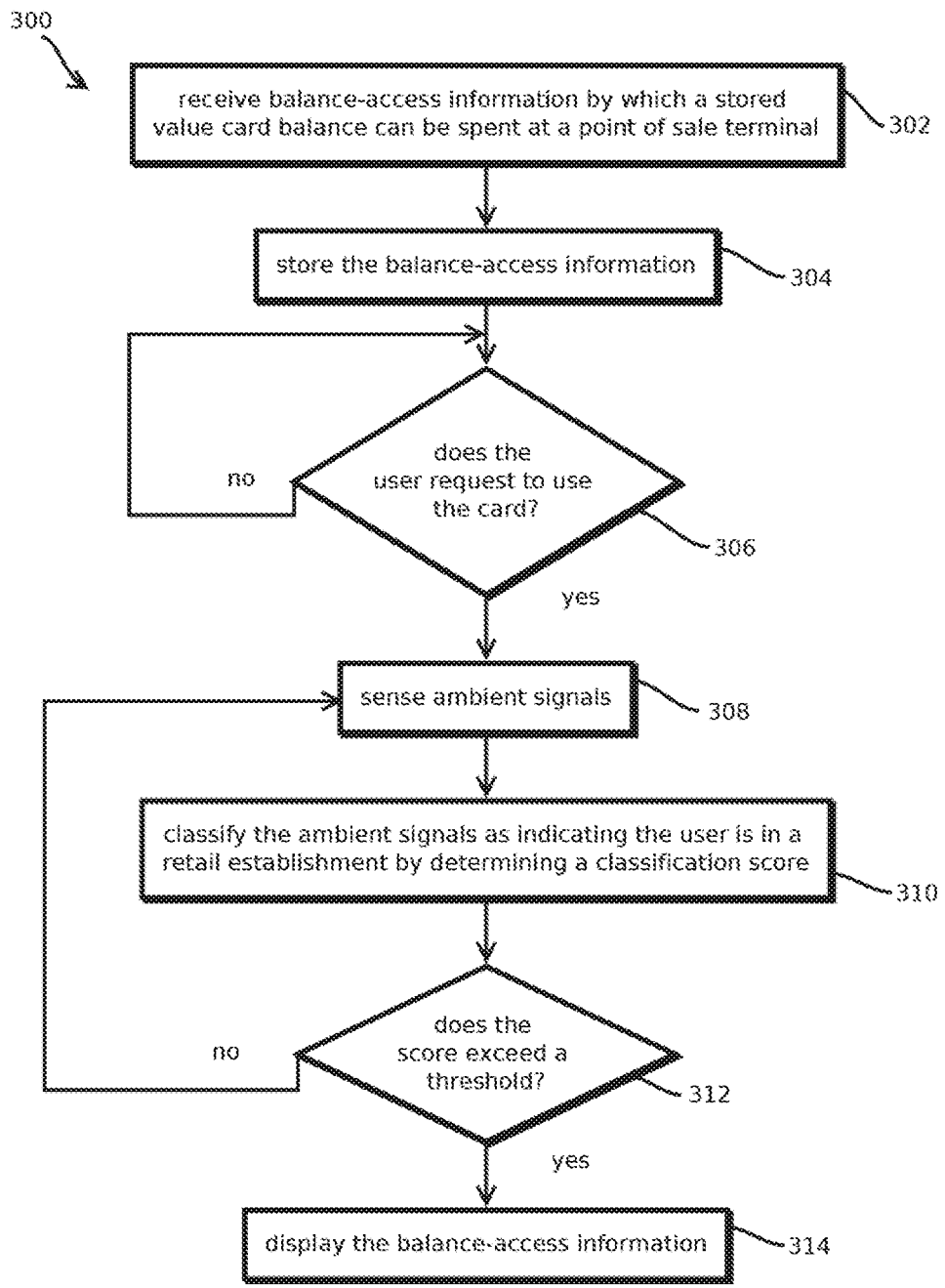
FIG. 3 illustrates an example of a process for reducing fraudulent use of gift cards that may be executed by some embodiments of client devices communicating with the system of FIG. 1.

FIG. 3 illustrates an example of a process 300 to selectively determine whether to display balance-access information for stored value cards based on the output of classifiers that determine whether the mobile computing device executing the process 300 is likely in a retail store. As noted, in some cases, some gift card exchanges may send buyers of gift cards balance access information for those gift cards, such as a gift card number and a pin number. In some cases, users may attempt to engage in fraudulent transactions by purchasing gift cards, recording in their personal records the balance-access information, and then returning the gift card back to the exchange, for instance, by selling the gift card back to the exchange or by only using a portion of the balance of a gift card that is automatically returned. Such users, wishing to engage in fraud, may then use the balance-access information to engage in a subsequent transaction, before the subsequent legitimate user of the gift card can use the remaining balance. For instance, the user may present online or in person the information in their personal record of the balance-access information to spend gift-card value that they surrendered to the exchange. To make such endeavors less attractive, some embodiments may selectively display the balance-access information in response to determining that the user is likely in a location at which they would have a legitimate reason for accessing such information, for example, at a point-of-sale terminal in a retail store that accepts the card.

In some cases, access may be granted in response to determining that the user has crossed a geo-fence associated with a retail store. However, such techniques, while consistent with some embodiments, may leave open some relatively easy avenues for exploitation, for instance, by accessing the information while in the user's car in the parking lot of the store. In some cases, satellite navigation and geolocation services available on mobile devices are often unreliable and imprecise for indoor positioning, particularly for determining whether the user is within a relatively close distance to point-of-sale terminal, like within 3 to 5 meters, or less. Accordingly, some embodiments may use signals from a variety of sensors to ascertain, based on the mobile computing device's current environment, whether the mobile computing device is likely being used in a legitimate transaction, or whether the mobile computing device is likely being accessed simply to view and record the balance-access information improperly. Some embodiments may engage in this routine in a relatively battery-friendly way, using a combination of ambient signals that collectively yield a relatively low false positive and low false negative rate, thereby providing a relatively seamless experience for the end-user. Further, some embodiments may accommodate a diverse array of types of point-of-sale terminals, including legacy systems that are not specifically configured to address these problems.

In some embodiments, the process 300 may be executed by a mobile computing device, such as a tablet computer, wearable computing device, cell phone, or the like, for instance, a hand-held mobile computing device having a battery. In some embodiments, the mobile computing device may have a suite of sensors, such as a microphone, one or more cameras, a light-intensity sensor, a time-of-flight sensor, an inertial measurement unit, a magnetometer, a satellite navigation signal receiver, and one or more radios, like a Bluetooth radio, a near-field communication radio, a Wi-Fi™ radio, and a cellular radio. Certain combinations of these sensors may produce signals that can be relatively reliably classified as indicating whether a user is in particular a retail store near a point-of-sale terminal. In some embodiments, the mobile computing device may have the features of the computing device described below with reference to FIG. 4, and in some embodiments, the mobile computing device may communicate via the net Internet with the above-described gift card management service, for instance, in the course of performing the process 200 of FIG. 2.

In some embodiments, the process 300 begins with receiving balance-access information by which a stored value card balance (also referred to as a gift card, but not limited to gift cards) can be spent at a point-of-sale terminal, as indicated by block 302. In some cases, this information may be obtained upon (e.g., in response to) a user requesting with a web browser or native mobile application a gift card usable at a particular retailer, for instance, from the above-described gift card management service of FIG. 1.

In some embodiments, this information may be received via email, text, or an API response, like an HTTP request. In some cases, the received balance-access information is received in encrypted form, for instance, as an additional layer of encryption underneath encryption used to convey the information over the Internet, such as a layer under SSL or TLS encryption. For example, the balance-access information may be stored in an AES 256 encrypted blob that is sent over the Internet via a TLS encrypted communication. In some embodiments, the balance-access information may be stored in encrypted form, such that a user interrogating program state or memory of the mobile computing device is unable to view the balance-access information. In some embodiments, the balance-access information is sent as a string, for example, a gift card number and a pin number. In some embodiments, the balance-access information is sent in the form of an image, such as a barcode image or QR code image that, upon being displayed on a display screen of the mobile computing device, can be scanned by a scanner at a point-of-sale terminal to enter the gift card information.

Next, some embodiments may store the received balance-access information, as indicated by block 304. As noted above, in some cases, this information may be stored in encrypted form on the client mobile computing device, for instance, after decrypting a TLS encrypted communication, leaving the encrypted blob in memory, without yet decrypting the AES 256 encryption. In some cases, decryption keys may be stored in obfuscated memory of the mobile computing device, for instance, distributed among several variables of source code by which a native mobile application is written, such that efforts to decompile or otherwise analyze compiled source code are less likely to reveal the decryption keys.

Next, some embodiments may determine whether the user requests to use the card, as indicated by block 306. In some cases, a user may request the card before step 302, and it should be generally noted that the steps described herein are not limited to the order in which the steps are displayed or described. In some embodiments, the user may request to use the gift card through multiple steps, for instance, by requesting gift cards for a particular retailer in a first request, for example, in a request to a native mobile application or webpage that secures responsive balance-access information from the gift card management service, and then later by the user selecting an input in a user interface of the webpage or native mobile application that indicates the user wishes to display the information for entry to a point-of-sale terminal. In some cases, a native mobile application or web page may have an event handler associated with a region of a display screen, and that event handler may detect an on-press event and, in response, advance the routine to additional steps of process 300, for instance, in a press-to-display user interface.

In some cases, a multi-region press may be requested or required, for instance, with two fingers of the user's left hand on one side of the screen and two fingers of the user's right hand on the other side of the screen, such that some inferences about the likely orientation of the screen relative to the user may be drawn by the native mobile application, particularly when combined with readings from an inertial measurement unit, as described below. For example, in some cases, the native mobile application may respond to such a multitouch input upon determining that the orientation of the screen is vertical, as would be the case when a user is holding the screen between their left and right fore fingers and thumbs vertically, with the screen oriented away from the user, toward a retail sales clerk viewing the screen to enter the balance access information into a point-of-sale terminal. Or, in some cases, a user may merely engage in input indicating the user wishes to use the card, and upon the user releasing a touch, the process may proceed.

Upon determining that the user does not yet request to use the card, some embodiments may continue to wait, or, upon determining that the user does request use the card, embodiments may proceed to the next step.

Next, some embodiments may sense ambient signals, as indicated by block 308. In some cases, waiting to sense ambient signals until the user requests to use the card may reduce battery drain associated with constantly monitoring such signals, for instance, even when the user is nowhere near a retail store or has shown no intent to use a gift card. (Or some embodiments may constantly monitor such signals to provide a more responsive experience at the expense of power consumption.) In some cases, sensing ambient signals may be triggered by one of the two stages of a request to use the card described above, for instance, in response to a user requesting gift cards associated with a given retailer. In some embodiments, sensing of ambient signals may have a timeout threshold at which point sensing may cease to protect the battery of the mobile computing device, and a user may be presented with an input by which the user can indicate an intent to continue attempting to use a gift card.

A variety of different types of signals may be sensed with a variety of different types of sensors on the mobile computing device. In some cases, some of the signals or sensed without regard to whether the user request use the gift card, while other signals, particularly more battery intensive sensors are engaged responsive to a user request. In some embodiments, the sensor is a radio of the mobile computing device, and the signal is a wireless beacon, such as a Wi-Fi beacon or a Bluetooth beacon, or an NFC identifier. In some embodiments, a beacon identifier encoded in the beacon may be compared against a list of identifiers associated with retail stores at which the gift card may be legitimately used, and a wireless environment score may be calculated based on the result of this comparison. For instance, a binary score of one may be output in response to detecting a match, indicating the user is within range of a beacon known to be in a store at which a gift card in memory is usable. In some cases, different scores may be calculated for different gift card stored in memory, as different gift cards may be associated with different types of retail stores and associated ambient environments.

In some cases, users may attempt to spoof such beacons, for instance, by programming the SSID of their home wireless router to match that broadcast at a store to trick systems relying on WiFi™ beacon information, or by configuring Bluetooth™ beacons to broadcast spoofed UUIDs. To frustrate such attacks, some embodiments may sense a rolling encrypted code broadcast in the beacon and determine whether that rolling encrypted code matches an expected current state for a beacon associated with such a retailer. In some cases, wireless beacons may broadcast a rolling encrypted code with a linear shift register algorithm, or with other techniques, like with a KeeLoq™ code. In some embodiments, matching of codes may be determined with one or more remote computing devices, such as via a request to the gift card management service described above, which may compare beacon identifiers to an index of beacon identifiers and respond with a store identifier or binary signal indicating a match. Or in some cases, the gift card management service or the mobile computing device may send a rolling encrypted beacon identifier to a third party server, which may respond with a store identifier.

In some embodiments, wireless radio signals may generally determine the geolocation of the mobile computing device, and classifiers for one or more other types of signals may be obtained in response. For example, classifiers for a set of features known to be associated with a given retail store may be downloaded and stored in cache memory in response to the mobile computing device crossing a geofence associated with that store. In another example, a set of classifiers may be sent to, and stored by, the mobile computing device in response to a particular gift card being sent to the device, for instance, a set of classifiers corresponding to a particular retailer at which the sent gift card is usable. As a result, relatively granular and store specific classifiers may be configured without storing such classifiers for every store to which a user may visit. In some embodiments, the techniques described in U.S. patent application Ser. No. 14/839,058, titled "REDUCING THE SEARCH SPACE FOR RECOGNITION OF OBJECTS IN AN IMAGE BASED ON WIRELESS SIGNALS," filed 28 Aug. 2015 may be used to this effect.

In another example, the sensed ambient signals may be audio signals sensed with a microphone of the mobile computing device. In some cases, the sensed signals may be time-series signals, such as an amplitude of audible signals that varies over time. In some cases, multiple microphones on the mobile computing device may sense multiple audio feeds, and those audio feeds may be used in subsequent steps to determine a directionality of signals.

In another example, a light intensity sensor on the mobile computing device may sense time varying light intensity in the environment of the mobile computing device, for instance, from overhead lighting. In some cases, location signals may be embedded in these fluctuations in the intensity of overhead lighting, or in some cases, different types of lighting may emit useful signals, like 120 Hz oscillations of fluorescent lights, that provide an additional signal by which location may be determined.

In another example, a camera of the mobile computing device may capture an image or sequence of images. In some embodiments, both a front facing and rear facing camera of the mobile computing device may capture images, for instance, to ascertain whether a screen of the mobile computing device is pointed towards a point-of-sale terminal and that a rear facing camera is pointed to a face of the user, thereby demonstrating that the user is less likely to be able to view information on the screen. In some cases, an array of cameras on one face of the mobile computing device may capture images, and computational photography techniques may be used to ascertain spatial information based upon a light field impending upon the mobile computing device. In another example, the mobile computing device may have a time-of-flight sensor by which a scan of 3-D surfaces is obtained, for instance, providing in combination with an image sensor, both a pixel intensity and pixel distance.

In another example, the mobile computing device may have a magnetometer, which may sense a time varying magnetic field and orientation of the magnetic field, such as the user moves through the store, or as may occur due to electromagnetic signals emitted by the operation of circuitry in a point-of-sale scanner. Variations in such signals, either in time or space, may be classified as indicating presence at a point of sale terminal.

In some cases, the mobile computing device may include an inertial measurement unit, such as a six axis accelerometer operative to sense changes in rotational velocity at about three orthogonal axes and the changes in linear translation speed about three orthogonal axes. In some cases, the inertial measurement unit may be operative to sense a downward direction due to acceleration from gravity. In some cases, the inertial measurement unit may output a multidimensional time series, such as a sequence of six dimensional values indicating sensor readings at each of six dimensions at each instance the inertial measurement unit is polled by a native mobile application.

Next, some embodiments may classify the ambient signals as indicating the user is in a retail establishment by determining a classification score, as indicated by block 310. In some cases, the classification score is a weighted combination of a plurality, e.g., two, three, four, five or more, sensor-specific classification scores. In some cases, these weights may be dynamically adjusted over time, for instance, in response to detected miss classifications to reduce a misclassification rate. For example, some embodiments may implement a stochastic gradient descent algorithm to reduce an amount of error on a training set of sensor signals labeled with values indicating whether the collection of signals correspond to a fraudulent use or a legitimate use for instance at a given retail store, such that store-specific sets of parameters may be downloaded upon determining that the user has crossed a geo-fence associated with the store.

In some embodiments, audio signals may be classified by calculating an audio classification score. In some cases, the audio signal may be normalized, for instance, by amplifying or suppressing the signal to reach a target root mean square value or maximum value in amplitude. In some embodiments, features may be extracted from the normalized signal. A variety of different types of features may be extracted. For instance, some embodiments may pass the normalized signal through one or more bandpass filters, and responses exceeding a threshold amplitude output from the bandpass filters may be designated as a feature. In some cases, the features may be two-dimensional features corresponding to both a duration and an indication that an output exceeding the threshold occurred. In some cases, such a feature may correspond to a beep sound emitted by a point-of-sale terminal known to be used by the merchant, for example, as the sales clerk scans items and the system beeps. In some cases, the sound of these beeps may be used as a signal indicative of the presence of a point-of-sale terminal. In another example, some embodiments may extract features by executing a Fourier analysis on the audio signal and extracting features from portions of the output that exceed some threshold duration or amplitude. In another example, some stores may embed location identifiers in in-store audio, and some embodiments may extract those identifier from the audio, for example, by time or frequency demultiplexing the audio signal. In some cases, classification models for the different audio signals may be store specific, and those models may be downloaded based on crossing a geo-fence associated with the store or downloading a card associated with the store. In another example, certain signals of relatively constant duration may be detected with a convolution layer of a neural net that convolve a kernel over time to classify whether a trailing duration of the audio signal includes a beep of a point-of-sale terminal (or other indicative signal). In some cases, such models may be trained by sampling audio and labeling sample audio as indicating a legitimate transaction or a fraudulent transaction, for example, based on logged sensor data and subsequent reported fraudulent uses or legitimate uses. Similar techniques may be used to capture signals from a magnetometer, for instance signals indicating variations in an electromagnetic field arising from operation of a point-of-sale terminal or related equipment, for instance, emitted due to circuitry within an a handheld scanner or theft detection system of the store. Or in some cases, variations in a magnetic field (and IMU) may be integrated to infer a user's geolocation more precisely.

In some embodiments, image signals may be classified, for instance, based on whether the image contains a point-of-sale terminal. In some embodiments, a training set of such images may be captured and manually labeled as including such a point-of-sale terminal. Some embodiments may train a neural network based on the labeled training set, for example, a convolution neural network having a convolution layer corresponding to the portion of the image depicting the point-of-sale terminal. In some cases, a particular part of the point-of-sale terminal may be detected, for instance, a hand-held scanner, which often includes a black screen that is relatively reliably detected in images or a display of a balance that may be relatively reliably detected, both with a relatively bandwidth sensitive classifier model. In some cases, the convolution layer may be applied multiple times across an image at different, overlapping portions of the image to determine whether output neuron of the convolution layer fires, indicating a point-of-sale terminal.

In some embodiments, multiple images may be captured. For example, facial features of the user may be captured in an image taken when setting up an account on a native mobile application, and later, using the techniques discussed above. Some embodiments may determine whether an image taken with a rear facing camera of the mobile computing device includes the user in the frame, while another image taken with another camera facing in the same direction as the screen, includes an image of a point-of-sale terminal. In another example, light signals emitted by a point-of-sale terminal in a scanning process may be detected, either with a light sensor or with a camera. For example, a barcode scanner or QR code scanner may emit a laser of a particular frequency (either or both in electromagnetic frequency and scanning frequency) that may be detected. In some cases, sensed light intensity may be passed through serial bandpass filters, such that light flickering at the scan rate of a barcode scanner, of a color of a scanner laser, is passed through the filters, and a resulting averaged image intensity over a duration of time including multiple scans may be compared to a threshold to classify the image sensor output as indicating the presence of a point-of-sale terminal.

Similar techniques may be used to classify image and time-of-flight sensor outputs. For example, a three-dimensional shape of a portion of a point-of-sale terminal, like a handheld scanner, may be detected in time-of-flight data, for instance, again, using a convolution layer of a trained neural network to account for translation invariant aspects of the signal captured by the mobile computing device.

In some embodiments, a multidimensional time series from the inertial measurement unit may be classified as indicating a particular gesture has occurred or that the mobile computing device is oriented in a particular direction. For instance, to determine whether the mobile computing device is oriented in a particular direction, some embodiments may determine whether the signal corresponding to a particular axis of the inertial measurement unit (e.g., averaged over some trailing duration of time, like one second) exceeds a threshold, indicating the consistent pull of gravity in a particular direction, like when the phone is oriented vertically right side up or upside down or horizontally right side up or upside down.

In some embodiments, a time series of such data may be used to determine whether a particular gesture has occurred, for instance, indicating that the user has rotated and translated the phone through space in a manner consistent with how a user typically presents a display screen to another person entering the information into a point-of-sale terminal, like when a user takes a phone facing towards their face, spins the phone 180° about a vertical axis, translates the phone downward, spins the phone 180° about a horizontal axis, and then tilts the phone away from themselves (spinning about an orthogonal horizontal axis), and holds the phone static. In some cases, users may engage in such motions at different speeds, through different distances and angular changes over time. Accordingly, some embodiments may classify such time series as including a qualifying gesture with a dynamic time warp analysis. For example, a training set of users may be asked to engage in the gesture, and a template for a dynamic time warp algorithm may be trained, for instance with dynamic programming and tuned constraints, based on the sensor data from the training exercise. Later, this template may be compared against sensor data obtained when a user request to use a gift card, and the sensor data may be classified as indicating a gesture associated with legitimate use.

Next, some embodiments may determine whether the classification score exceeds a threshold, as indicated by block 312. In some cases, this threshold may be modulated with the techniques described above by which the weights for combining the various classification scores are combined. Upon determining that the score does not exceed the threshold, some embodiments may continue to sense ambient signals, returning the step 308, in some cases until a timeout determination is made to preserve the battery life of the mobile computing device.

Alternatively, upon determining that the score exceeds a threshold, some embodiments may cause the mobile computing device to display the balance-access information, as indicated by block 314. In some cases, the balance access information may be decrypted and displayed on a display screen of the mobile computing device. In some embodiments, a barcode may be formed from string balance-access information, such as a linear barcode or a QR code, and a resulting image may be displayed, such that the image may be scanned to enter the information into a point-of-sale terminal. Or in some cases, the information may be displayed in human-readable form, such that a salesclerk can type the information into a point-of-sale terminal. Or, in some cases, the image of the barcode or QR code may be formed on the remote server, and the image may be downloaded, though this use is expected to be higher bandwidth relative to systems that compose such images on the mobile computing device, as the string data encoded therein is often much less data intensive.

A variety of techniques may be executed to impede users from capturing the displayed information. Some embodiments may instruct a mobile computing device to block the mobile computing device from performing a screen capture. Some embodiments may display the balance-access information for a threshold amount of time that is relatively short (e.g., less than five seconds, less than one second, or less than one-half of one second), such that the information may be captured by a machine, but is too quickly removed to be reliably captured by human being. Some embodiments may flash the information on the screen repeated times, such that the scanner has multiple opportunities to capture the information, while a human would find it difficult to record the information. Some embodiments may animate movement of the code on the screen to bring the code in and out of focus of a user camera attempting to capture an image of the code, e.g., exceeding a tracking rate of typical autofocus mechanisms in consumer cameras, while staying within a tracking rate that can be accommodated by point of sale scanners. Some embodiments may compose a plurality of scannable codes, like barcodes, some of which are internally inconsistent and invalid (e.g., dummy codes), and one of which contains the balance-access information in an internally consistent scannable code. In some cases, formats for some scannable codes include redundancy for purposes of error detection and correction, like parity bits. Some embodiments may flash a sequence of scannable codes in which all but one of the scannable codes in the sequence, for example, a randomized one in the sequence, contain invalid codes in which the error detection and correction rules are violated, for instance, with an incorrect parity bit. As a result, it is expected that a point-of-sale terminal scanning the flashing codes will reject all but the legitimate code, while a user attempting to write down the codes will not know which one is legitimate without a much more laborious effort. In some cases, an entire screen may be varied in intensity in synchronicity with a scanning rate of a barcode scanner, such that the lightness or darkness of the screen varies according to what a barcode scanner would sense while transiting across a barcode, thereby conveying a signal to the barcode scanner that matches what would be perceived by a static one or two dimensional barcode without presenting a static image that a user can readily visually parse.

Thus, with various combinations of the above techniques, users may be deterred from engaging in fraud.

In some embodiments, the gift card management system of FIG. 1 may execute various routines to further reduce the likelihood of fraud. For instance, some embodiments may infer register balances and select gift cards to match the inferred balance to expedite gift card exhaustion. For instance, some embodiments may estimate a register balance based on a distribution of previous know balances for a given retailer and for users deemed to have a profile similar to that of the user requesting cards. Some embodiments may then obtain a set of candidate cards and select among the candidate cards based on 1) a current balance of the candidate card; 2) a risk score determined for each candidate card (e.g., based on an amount of users who have had access to the card and whether those users have a relatively long history of non-fraudulent card use recorded in the system). Some embodiments may select the card closest to the inferred register balance having a risk score above a threshold. Some embodiments may calculate a weighted combination of the risk score and an inverse of the difference between the inferred register balance (or an actual balance) and the card balance. Some embodiments may rank the cards based on this weighted combined score and select a highest scoring card. Some embodiments may select a riskiest card having a balance expected to be exhausted by the inferred register balance.

Similarly, some embodiments may suppress the number of cards a user accesses in a transaction. For instance, a user may combine two or three or more gift card balances to pay a register balance. The more cards consumed and not exhausted, the greater the risk of fraud. Accordingly, some embodiments may rate limit a number of cards a user is allowed to access or rate limit an aggregate balance of cards a user can access. Similarly, some embodiments may select among candidate cards to reduce the number provided to a given users, e.g., by favoring cards close to the inferred (or actual) register balance.

Further, some embodiments may distribute cards geographically to enhance the power of the purchase location to signal fraud. In some cases, a card may be sent to a first geographic area and returned with a balance. Later, a user in a different geographic area (e.g., more than a threshold distance, or having less than a threshold co-occurrence rate among users between the two locations) may request a card for the same retailer. The card for the later user may be selected in response to determining that this geographic threshold is satisfied. A different later user in the first geographic location may not be provided the card upon determining that the geographic locations are the same. Later, if fraud occurs, the location of the fraud is expected to be indicative of which user holding a given card engaged in fraud, as it is expected to be less likely that a user will travel to a relatively distant geographic location to spend a card they previously surrendered, rather than attempt to use the same card in their same area.

Figure 4:
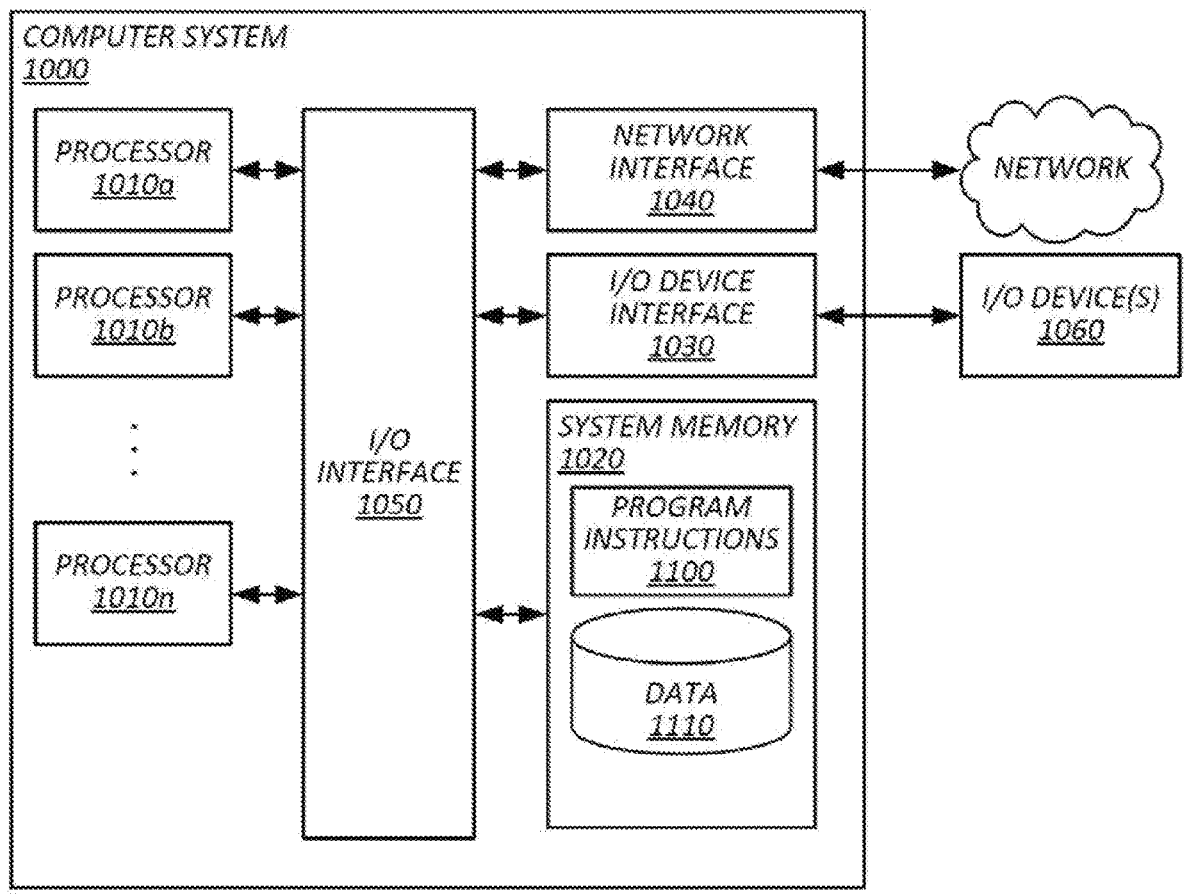
FIG. 4 illustrates an example of a computer system by which the above techniques may be implemented.

FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A tangible, non-transitory machine-readable media storing instructions to classify ambient signals to reduce fraudulent use of stored value card information, wherein the instructions, when executed by one or more processors of a mobile computing device effectuate operations comprising; receiving, with the mobile computing device, from a remote server, balance-access information by which a stored value card balance can be spent at a point of sale terminal; storing, with the mobile computing device, the balance-access information; sensing, with one or more sensors of a mobile computing device, ambient signals; classifying the ambient signals as indicating the user is in a retail establishment; and in response to the classification, displaying, on a display screen of the mobile computing device, the balance-access information, such that the balance-access information can be input to a point-of-sale terminal.

2. The media of embodiment 1, wherein: sensing ambient signals comprises: sensing audio; sensing an image; sensing an orientation; and sensing a wireless beacon; and classifying the ambient signals as indicating the user is in a retail establishment comprises: calculating a score based on a weighted combination of a classification of the sensed audio, a classification of the image, a classification of the orientation, and a classification of the wireless beacon; and determining that the score satisfies a threshold.

3. The media of any of embodiments 1-2, comprising: determining a geolocation of the mobile computing device; requesting from a remote server parameters of an ambient signal classifier pertinent to the geolocation; receiving the parameters; and wherein classifying the ambient signals comprises classifying the ambient signals based on the parameters.

4. The media of embodiment 3, wherein determining a geolocation of the mobile computing device comprises: receiving an encrypted rolling code emitted by a wireless beacon; and validating that the encrypted rolling code corresponds to wireless beacon of a retailer.

5. The media of any of embodiments 1-4, wherein sensing ambient signals comprises sensing audio with a microphone of the mobile computing device.

6. The media of embodiment 5, wherein classifying the ambient signals comprises: normalizing the audio; extracting a feature vector from the normalized audio; and scoring the feature vector with a value indicating a likelihood of whether the user is in a retail establishment.

7. The media of any of embodiments 5-6, wherein classifying the ambient signals comprises: extracting a feature by passing a representation of the audio through a band-pass filter.

8. The media of any of embodiments 5-7, wherein classifying the ambient signals comprises: extracting a feature by determining a Fourier transform of a representation of the audio.

9. The media of any of embodiments 5-9, wherein the features comprise: an audio signal within a range of frequencies; and duration of the audio signals within the range of frequencies.

10. The media of embodiment 9, wherein the range of frequencies is selected from among a plurality of ranges of frequencies based on a geolocation sensed by the mobile computing device.

11. The media of any of embodiments 1-10, wherein sensing ambient signals comprises receiving a reading from an inertial measurement unit (IMU) of the mobile computing device.

12. The media of embodiment 11, wherein classifying the ambient signals comprises: determining an orientation of the mobile computing device with respect to gravity.

13. The media of any of embodiments 11-12, wherein classifying the ambient signals comprises: classifying a multi-dimensional time series of readings from the IMU as indicating a gesture.

14. The media of embodiment 13, wherein classifying a multi-dimensional time series of readings from the IMU as indicating a gesture comprises dynamic time warping the multi-dimensional time series.

15. The media of any of embodiments 1-14, wherein sensing, with one or more sensors of a mobile computing device, ambient signals comprises: sensing an image with a camera of the mobile computing device.

16. The media of embodiment 15, wherein classifying the ambient signals comprises: classifying the image as containing at least part of a point-of-sale terminal.

17. The media of any of embodiments 15-16, wherein classifying the ambient signals comprises: classifying the image as containing at least part of a point-of-sale terminal by detecting translation invariant features in the image corresponding to the point-of-sale terminal with a convolution layer of a neural network.

18. The media of any of embodiments 15-17, wherein classifying the ambient signals comprises: classifying two images from two cameras of the mobile computing device by determining that one image from a camera facing in a direction opposite the display screen contains the user's face, such that the display screen is oriented away from the user.

19. The media of any of embodiments 1-18, wherein classifying the ambient signals comprises performing steps for classifying the ambient signals.

20. The media of any of embodiments 1-19, wherein displaying, on a display screen of the mobile computing device, the balance-access information comprises: receiving an input from a touchscreen of the mobile computing device indicating a user input; in response to the user input, displaying the balance-access information; determining that the user input has ceased and, in response, ceasing to display the balance access information.

21. The media of any of embodiments 1-20, the instructions comprising: determining a geolocation of the mobile computing device; presenting at the mobile computing device and based on the geolocation, a first gift card; determining that the first gift card has been utilized in a transaction; and based on a determination that the first gift card has been utilized in the transaction, providing a second gift card at the mobile computing device.

22. A method, comprising: the operations of any of embodiments 1-21.

23. A system, comprising: one or more processors; and memory storing instructions that when executed by the processors cause the processors to effectuate operations comprising: the operations of any of embodiments 1-21.

What is claimed is:

1. A tangible, non-transitory machine-readable media storing instructions to classify ambient signals to reduce fraudulent use of stored value card information, wherein the instructions, when executed by one or more processors of a mobile computing device effectuate operations comprising:

receiving, with the mobile computing device, from a remote server, balance-access information by which a stored value card balance can be spent at a point of sale terminal;

storing, with the mobile computing device, the balance-access information;

determining a geolocation of the mobile computing device;

in response to determining that the geolocation of the mobile computing device has crossed a geo-fence associated with a retail establishment, requesting store-specific parameters from a remote server;

receiving the store-specific parameters;

sensing, with one or more sensors of the mobile computing device, ambient signals;

classifying the ambient signals, based on the store-specific parameters, as indicating the user is in the retail establishment; and in response to the classification, displaying, on a display screen of the mobile computing device, the balance-access information, such that the balance-access information can be input to a point-of-sale terminal.

2. The media of claim 1, wherein:
sensing ambient signals comprises:
- sensing audio;
- sensing an image;
- sensing an orientation; and
- sensing a wireless beacon; and classifying the ambient signals as indicating the user is in the retail establishment comprises:
- calculating a score based on a weighted combination of a classification of the sensed audio, a classification of the image, a classification of the orientation, and a classification of the wireless beacon; and
- determining that the score satisfies a threshold.

3. The media of claim 1, wherein determining a geolocation of the mobile computing device comprises:
- receiving an encrypted rolling code emitted by a wireless beacon; and
- validating that the encrypted rolling code corresponds to wireless beacon of a retailer.

4. The media of claim 1, wherein sensing ambient signals comprises sensing audio with a microphone of the mobile computing device.

5. The media of claim 4, wherein classifying the ambient signals comprises:
- normalizing the audio;
- extracting a feature vector from the normalized audio; and
- scoring the feature vector with a value indicating a likelihood of whether the user is in a retail establishment.

6. The media of claim 4, wherein classifying the ambient signals comprises:
- extracting a feature by passing a representation of the audio through a band-pass filter.

7. The media of claim 4, wherein classifying the ambient signals comprises:
- extracting a feature by determining a Fourier transform of a representation of the audio.

8. The media of claim 4, wherein the features comprise:
- an audio signal within a range of frequencies; and
- duration of the audio signals within the range of frequencies.

9. The media of claim 8, wherein the range of frequencies is selected from among a plurality of ranges of frequencies based on a geolocation sensed by the mobile computing device.

10. The media of claim 1, wherein sensing ambient signals comprises receiving a reading from an inertial measurement unit (IMU) of the mobile computing device.

11. The media of claim 10, wherein classifying the ambient signals comprises:
- determining an orientation of the mobile computing device with respect to gravity.

12. The media of claim 10, wherein classifying the ambient signals comprises:
- classifying a multi-dimensional time series of readings from the IMU as indicating a gesture.

13. The media of claim 12, wherein classifying a multi-dimensional time series of readings from the IMU as indicating a gesture comprises dynamic time warping the multi-dimensional time series.

14. The media of claim 1, wherein sensing, with one or more sensors of a mobile computing device, ambient signals comprises:
- sensing an image with a camera of the mobile computing device.

15. The media of claim 14, wherein classifying the ambient signals comprises:
- classifying the image as containing at least part of a point-of-sale terminal.

16. The media of claim 14, wherein classifying the ambient signals comprises:
- classifying the image as containing at least part of a point-of-sale terminal by detecting translation invariant features in the image corresponding to the point-of-sale terminal with a convolution layer of a neural network.

17. The media of claim 14, wherein classifying the ambient signals comprises:
- classifying two images from two cameras of the mobile computing device by determining that one image from a camera facing in a direction opposite the display screen contains the user's face, such that the display screen is oriented away from the user.

18. The media of claim 1, wherein classifying the ambient signals comprises performing steps for classifying the ambient signals.

19. The media of claim 1, wherein displaying, on a display screen of the mobile computing device, the balance-access information comprises:
- receiving an input from a touchscreen of the mobile computing device indicating a user input;
- in response to the user input, displaying the balance-access information; and
- determining that the user input has ceased and, in response, ceasing to display the balance access information.

* * * * *